Patented May 2, 1950

2,505,834

UNITED STATES PATENT OFFICE 2,505,834

PENICILLENIC ACID G AND ESTERS THEREOF AND PROCESS FOR PRODUCING SAME

Robert L. Peck, Plainfield, N. J., assignor to Merck & Co., Inc., Rahway, N. J., a corporation of New Jersey No Drawing. Application December 21, 1945, Serial No. 636,517

11 Claims. (Cl. 260—307)

This invention relates to certain new chemical compounds and particularly to penicillenic acid G and esters thereof, which are useful as intermediates in the synthesis of penicillin and other chemically related compounds having antibiotic activity, and the process for preparing such compounds.

Penicillenic acid G [Chemical Abstracts' nomenclature: N-(2-benzyl-5-oxo-4(5)-oxazolylidenemethyl)-penicillamine] and esters thereof are represented by the following structural formula:

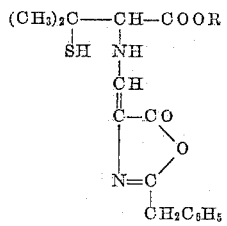

wherein R is hydrogen or an alkyl or aryl radical such as methyl, ethyl, benzyl and the like. In preparing these compounds the starting materials employed are penicillin G having the structural formula:

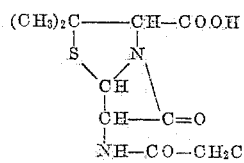

which is readily obtained by growing the organism *Penicillium notatum* #832 NRRL in a nutrient medium and extracting the acidified medium with a solvent such as amyl acetate; a salt of penicillin G which is readily obtained by reacting penicillin G with a weak base such as sodium bicarbonate; or esters of penicillin G which are readily prepared by reacting penicillin G with diazoalkanes such as diazomethane, diazoethane, phenyldiazomethane, diphenyldiazomethane, or the like.

Penicillin G or an ester of penicillin G is converted to penicillenic acid G or the corresponding ester thereof by dissolving in a suitable solvent such as alcohol, ethyl acetate or the like, reacting with about one molar equivalent of mercuric chloride, thereby forming the mercury mercaptide of the desired product. For identification and characterization of the products they are preferably isolated as the mercaptides. To a reaction mixture containing the mercaptide of penicillenic acid G is added a quantity of sodium bicarbonate which forms a precipitate of sodium chloride. Upon filtration of the mixture and acidification of the mother liquor, a precipitate of the mercaptide in essentially pure form is obtained. This precipitate is soluble in aqueous sodium bicarbonate solution and such solutions, as well as the organic solvent reaction mixtures containing the mercaptides, have characteristic ultraviolet absorption spectra, showing maxima at about 3250 Å.

Penicillenic acid G, and esters thereof, can be prepared from the corresponding mercury mercaptides by treating a suspension of the mercaptide in a mixture of aqueous pH 7.0 phosphate buffer solution and ether with hydrogen sulfide gas thereby removing mercury as a precipitate of mercuric sulfide. When precipitation of the mercuric sulfide is complete, the mixture is filtered and the resulting filtrate contains an ester of penicillenic acid G, if the starting material was an ester of penicillin G, or a salt of penicillenic acid G, if the starting material was free penicillin G.

Esters of penicillenic acid G are recovered from such filtrate by extracting with ether and evaporating the ether solution. Free penicillenic acid G is recovered from filtrates containing salts of penicillenic acid G by carefully acidifying such a filtrate in the presence of ether, and then thoroughly extracting with ether and evaporating the ethereal solution of penicillenic acid G.

The penicillenic acid G and esters thereof are further characterized by the fact that upon cleavage with alkali, as, for example, by reacting the acid, and ester, or a corresponding mercaptide thereof with about 2.5 N sodium hydroxide, penicillamine or its ester and 2-benzyl-4-hydroxymethylene-5(4)-oxazolone are formed.

The following examples are illustrative of the process and products of the present invention but it is to be understood that these examples are given by way of illustration and not of limitation.

Example 1

About 9.2 mg. of penicillin G (free acid) was dissolved in one cc. of methanol and mixed with one cc. of 10% mercuric chloride in methanol. The rotation of the material fell to $(\alpha)_D^{25}$ +68° within seven minutes. This represents the formation of the mercury mercaptide of penicillenic acid G having the structural formula:

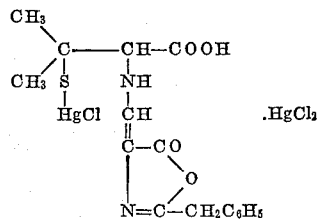

After about 30 minutes the rotation of the solution was approximately constant at $(\alpha)_D^{25}$ +27°.

*Example 2*

About 101 mg. of sodium penicillin G was dissolved in 3 cc. of water and mixed with 3 cc. of an aqueous solution containing 152 mg. of mercuric chloride. After about ten minutes, 141 mg. of sodium bicarbonate in 2 cc. of water was added. The precipitate of sodium chloride which formed was centrifuged off after about 30 minutes. Formation of a small amount of precipitate began before addition of sodium bicarbonate. Acidification of the mother liquors gave a precipitate of the mercury mercaptide of penicillenic acid G which was soluble in aqueous sodium bicarbonate solution. The solution of this precipitate showed a band in the ultraviolet at 3250 Å with $E_m$ of about 4000.

A quantity of the mercaptide, obtained as above described, was suspended in a mixture of cold aqueous pH 7.0 phosphate buffer and ether and treated with hydrogen sulfide gas causing precipitation of mercuric chloride. This was filtered off and the filtrate was carefully acidified with hydrochloric acid (preferably with cooling), and then extracted with ether. Free penicillenic acid G was obtained by evaporating the ethereal solution.

*Example 3*

By treating 25 mg. of methyl penicillin G in ethyl acetate solution with 1 molar equivalent of mercuric chloride there was obtained in about 30 minutes a solution of the mercury mercaptide of methyl penicillenate G with $(\alpha)_D^{25}$ +74°. The mercury mercaptide of methyl penicillenate G can be represented by the structural formula:

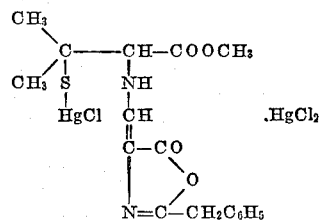

The product showed in the ultraviolet a strong band at 3200 Å with $E_m$ 6560. When the same conditions as above were used, but pyridine was also added in amount equivalent to the mercuric chloride, the product had $(\alpha)_D^{25}$ +87° after about 45 minutes. The ultraviolet absorption spectrum of the latter product showed a band with $E_m$ 11,050 at 3200 Å.

The ethyl acetate reaction mixture obtained above was evaporated to dryness in vacuo at low temperature yielding a residue containing crude mercury mercaptide of methyl penicillenate G. A quantity of this residue was suspended in a mixture of pH 7.0 phosphate buffer solution and ether and treated with hydrogen sulfide gas forming a precipitate of mercuric sulfide. The precipitate was filtered off, the filtrate extracted with ether and the ethereal solution evaporated yielding the methyl penicillenate G.

It will be understood that other esters of penicillenic acid G can be obtained by following the procedures given above merely by changing the starting material and employing the particular ester of penicillin G such as ethyl penicillin G, benzyl penicillin G, or the like. The mercury mercaptides of esters of penicillenic acid G may be represented by the structural formula:

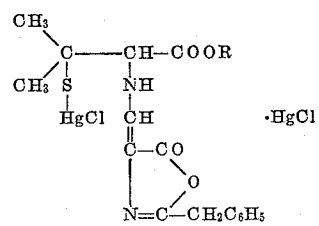

wherein R represents an alkyl or aryl radical.

Modifications may be made in carrying out the present invention without departing from the spirit and scope thereof and the invention is to be limited only by the appended claims.

I claim:

1. A substance of the class consisting of compounds having the structural formula:

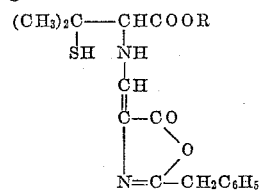

wherein R is of the class consisting of hydrogen and hydrocarbon radicals.

2. Penicillenic acid G

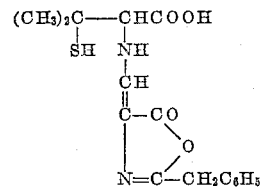

3. Methyl penicillenate G

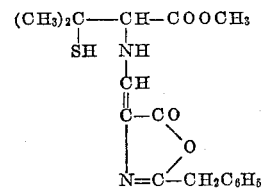

4. Esters of penicillenic acid G having the formula:

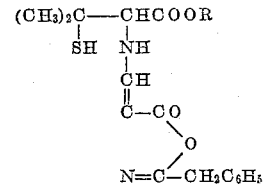

wherein R is a hydrocarbon radical.

5. The process that comprises reacting penicillin G in organic solution with mercuric chloride and recovering from the reaction mixture the mercury mercaptide of penicillenic acid G

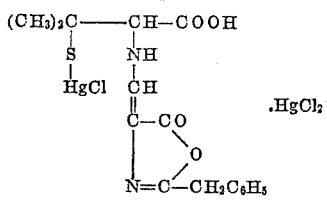

6. The process that comprises reacting methyl penicillin G in organic solvent solution with mercuric chloride and recovering from the reaction mixture the mercury mercaptide of methyl penicillenate G

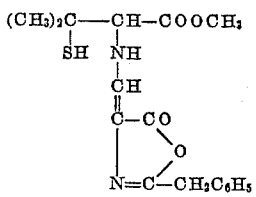

7. The process that comprises suspending the mercury mercaptide or penicillenic acid G in a mixture of pH 7.0 buffer solution and ether, passing hydrogen sulfide gas through the suspension, filtering off the mercuric sulfide thus formed, acidifying the filtrate, extracting with ether, and recovering penicillenic acid G

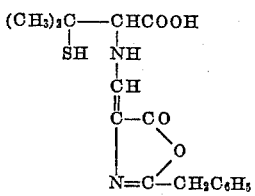

from the ethereal solution.

8. In a process for preparing a compound of the class consisting of penicillenic acid G and esters thereof, the steps that comprise reacting a substance of the class consisting of penicillin G, salts of penicillin G, and esters of penicillin G, in organic solvent solution with mercuric chloride thereby forming the mercury mercaptide of the penicillenic acid compound having the structural formula:

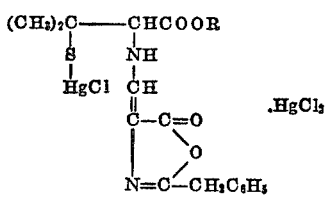

wherein R is a radical selected from the group consisting of hydrocarbon radicals and hydrogen, and removing mercury therefrom by reacting the same with hydrogen sulfide and separating the mercuric sulfide thus formed.

9. The process that comprises reacting a substance of the class consisting of penicillin G and salts and esters thereof in organic solvent solution with mercuric chloride, thereby forming the mercury mercaptide of the compound of the class consisting of penicillenic acid G and esters thereof, said mercury mercaptide having the structural formula:

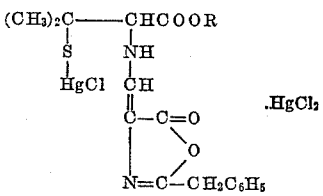

wherein R is a radical selected from the group consisting of hydrocarbon radicals and hydrogen.

10. The process that comprises reacting an ester of penicillin G in organic solvent solution with mercuric chloride and recovering from the reaction mixture the corresponding ester of penicillenic acid G having the structural formula:

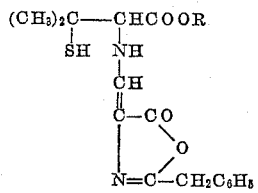

wherein R is a hydrocarbon radical.

11. The process that comprises suspending the mercury mercaptide of an ester of penicillenic acid G in a mixture of pH 7.0 buffer solution and ether, passing hydrogen sulfide gas through the suspension, filtering off the mercuric sulfide thus formed, extracting the filtrate with ether, and recovering the ester of penicillenic acid G from the ethereal solution, said ester of penicillenic acid G having the structural formula:

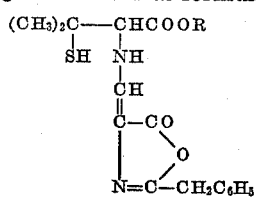

wherein R is a hydrocarbon radical.

ROBERT L. PECK.

REFERENCES CITED

The following references are of record in the file of this patent:

Merck, Synthetic Studies on Penicillin G Informal Monthly Progress Reports, Feb. 29, 1944 (MXII A), page 14.